United States Patent [19]

Caunt et al.

[11] 4,193,893

[45] Mar. 18, 1980

[54] TRANSITION METAL CATALYST

[75] Inventors: Anthony D. Caunt; Peter I. Vincent; Alan B. Newton, all of Welwyn Garden City, England

[73] Assignee: Imperial Chemical Industries Limited, London, England

[21] Appl. No.: 856,985

[22] Filed: Dec. 2, 1977

Related U.S. Application Data

[63] Continuation of Ser. No. 688,546, May 21, 1976, abandoned.

[30] Foreign Application Priority Data

May 28, 1975 [GB] United Kingdom ............... 23324/75

[51] Int. Cl.$^2$ ............................................. B01J 31/02
[52] U.S. Cl. ............................. 252/429 B; 252/429 C; 526/351; 526/140; 526/142; 526/906
[58] Field of Search ........................ 252/429 B, 429 C

[56] References Cited

U.S. PATENT DOCUMENTS

| | | | |
|---|---|---|---|
| 3,752,797 | 7/1973 | Gordon et al. .................... | 260/93.7 |
| 3,940,345 | 2/1976 | Caunt ................................ | 252/429 B |

FOREIGN PATENT DOCUMENTS

| | | | |
|---|---|---|---|
| 1317044 | 5/1973 | United Kingdom ................. | 252/429 B |
| 1324173 | 7/1973 | United Kingdom ................. | 252/429 B |
| 1336770 | 11/1973 | United Kingdom ................. | 252/429 B |
| 1351822 | 5/1974 | United Kingdom . | |
| 1419772 | 12/1975 | United Kingdom ................. | 252/429 B |

*Primary Examiner*—John F. Niebling
*Attorney, Agent, or Firm*—Cushman, Darby & Cushman

[57] ABSTRACT

A transition metal product, for example a titanium trichloride material, is obtained by milling a solid transition metal compound with a carboxylic acid or an ester thereof, for example methylmethacrylate and contacting with an organo-Lewis Base such as an amine, an organo-phosphorus compound or a sulphone derivative. The organo-Lewis Base may be milled with the transition metal compound or may be added to the transition metal compound as a solution in an inert liquid. The product can be used as a component of an olefine polymerization catalyst.

11 Claims, No Drawings

TRANSITION METAL CATALYST

This is a continuation of application Ser. No. 688,546 filed May 21, 1976, now abandoned.

The present invention relates to the treatment of transition metal compounds and to the use of such compounds as one component of an olefine polymerisation catalyst.

According to the present invention a solid compound of a transition metal of Groups IVA to VIA of the Periodic Table is ground with a minor proportion of at least one organic compound of the formula $$R^1COOR^2$$

and also contacted with a minor proportion of at least one organo-Lewis Base compound which is an organic compound containing at least one heteroatom which is a phosphorus, nitrogen or sulphur atom, wherein $R^1$ is an alkyl, aryl, alkenyl, aralkyl or alkaryl group, and $R^2$ is a hydrogen atom or an alkyl, aryl, alkenyl, aralkyl or alkaryl group.

The minor proportion of the organic compound and the organo-Lewis Base compound is at least 0.01, and not more than 1.00 mole of the organic compound or the organo-Lewis Base compound for each gramme atom of the transition metal which is present in the solid compound of the transition metal.

For convenience, the term "compound A" will hereafter be used to refer to compounds of the formula $$R^1COOR^2$$

and the term "Lewis Base" will be used to refer to the organo-Lewis Base compounds which are organic compounds containing at least one heteroatom which is a phosphorus, nitrogen or sulphur atom.

In the the transition metal compound, it is preferred that the metal has a valency below its maximum. The transition metal can be, for example, zirconium or vanadium, but it is particularly preferred to use a compound of titanium. It is preferred that the transition metal compound is a transition metal halide or oxyhalide (for example VOCl$_2$), and in particular a chloride, especially titanium trichloride. The term "titanium trichloride" is used herein to refer not only to pure titanium trichloride, but also titanium trichloride compositions which incorporate other materials, in particular aluminium chloride or alkyl aluminium chlorides. Such forms of titanium trichloride are obtained by the reduction of titanium tetrachloride with aluminium metal or an organo-aluminium compound. Materials of the type, titanium trichloride/aluminium chloride, which are obtainable by the reduction of titanium tetrachloride with aluminium metal, are particularly preferred.

For convenience, the term "ground transition metal compound" will be used hereafter in referring to the "solid compound of a transition metal of Groups IVA to VIA of the Periodic Table which has been ground with a minor proportion of at least one organic compound of the formula $$R^1COOR^2".$$

In the compound A, $R^1$ and $R^2$, are both conveniently an alkyl or alkenyl group containing 1 up to 20, preferably 1 up to 6, carbon atoms or an aryl, aralkyl or alkaryl group containing 6 up to 15 carbon atoms. Compound A is preferably an ester, and suitable materials of this type include methylmethacrylate.

The Lewis Base is preferably an organic compound containing at least two heteroatoms, at least one of which is a phosphorus, nitrogen or sulphur atom, and at least the other of which is a phosphorus, nitrogen, sulphur or oxygen atom. The Lewis Base can be an organo-phosphine, an organo-phosphite, an organo-phosphate, an organo-phosphine oxide, an amine, (which term is used to include diamines and cyclic amines), or an organo-compound which includes at least one sulphone (—SO$_2$—) group. More specifically, the Lewis Base has one of the general formulae $$R^3R^4R^5P(O)_m \qquad (1)$$

where $R^3$, $R^4$ and $R^5$ are each independently, an alkyl or aryl group, or a group —NR$^6$$_2$ or —OR$^6$;

$R^6$ is an alkyl group of 1 to 4 carbon atoms; and m is 0 or 1; or $$R^7R^8R^9N \qquad (2)$$

where $R^7$ and $R^8$ are hydrocarbyl groups; and $R^9$ is a hydrogen atom, an alkyl group or a group —C$_n$H$_{2n}$NR$^7$R$^8$;

or $R^7$ and $R^8$, optionally with $R^9$, together form a substituted or unsubstituted, saturated or unsaturated, condensed or uncondensed ring system; and n is 1, 2 or 3; or

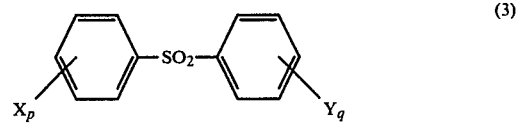

(3)

where

X, or each X, is, independently, a halogen atom, an alkyl, aryl, alkoxy, aryloxy, alkylthio, or arylthio group, or a group —NR$^{10}$R$^{11}$, or two groups X can together form a saturated or unsaturated hydrocarbon ring;

Y, or each Y, is, independently, a halogen atom, an alkyl, aryl, alkoxy, aryloxy, alkylthio, or arylthio group, or a group —NR$^{10}$R$^{11}$, or two groups Y can together form a saturated or unsaturated hydrocarbon ring; or a group X and a group Y may be replaced by a link between the two phenyl groups attached to the —SO$_2$— group, the linkage being either direct or through a group —O—, —CH$_2$—, —NR$^{10}$—, —S— or —CO—;

$R^{10}$ is a hydrogen atom or a hydrocarbyl group;

$R^{11}$ is a hydrocarbyl group; and p and q are each, independently, an integer from 0 up to 5; or

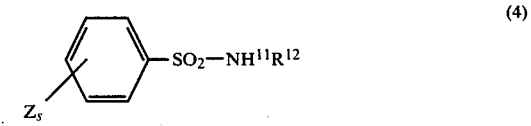

(4)

where

Z, or each Z is, independently, a halogen atom, an alkyl, aryl, alkoxy, aryloxy, alkylthio, or arylthio group, or a group —NR$^{10}$R$^{11}$, or two groups Z can together form a saturated or unsaturated hydrocarbon ring;

R$^{10}$ and R$^{11}$ are as defined;

R$^{12}$ is a hydrocarbyl group or a group

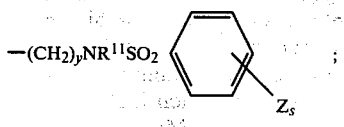

s is an integer from 0 up to 5; and y is a positive integer; or $$R^{13}R^{14}P(Q)_zED \qquad (5)$$

wherein

R$^{13}$ is a halogen atom, a hydrocarbyl group, a group —NR$_2^{11}$ or —OR$^{11}$, a heterocyclic group or a group (E—L—G);

R$^{11}$ is as defined;

R$^{14}$ is a halogen atom, a hydrocarbyl group, a group —NR$_2^{11}$ or —OR$^{11}$, a heterocyclic group, a group (E—L—G) or ED;

each E is —O—, —S—, or —NR$^{11}$—, and may be the same or different;

G is —OR$^{11}$, —SR$^{11}$, —NR$^{11}_2$, —PR$^{11}_2$ or a heterocyclic ring system whereof the heteroatom is O, S, N, or P;

D is a group —LG or —P(Q)$_z$R$^{13}$R$^{14}$, or, when R$^{14}$ is ED, both the D groups may together form a group —L—;

L is a bivalent hydrocarbyl radical such that E and G or E and E are separated by not more than 3 carbon atoms;

Q is an oxygen or sulphur atom; and z is 0 or 1; or

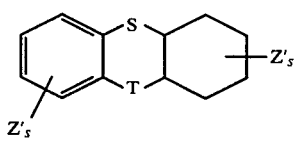 (6)

where

Z', or each Z' is, independently, a halogen atom, an alkyl, aryl, alkoxy, aryloxy, alkylthio, or arylthio group or a group —NR$^{10}$R$^{11}$;

T is an oxygen or sulphur atom or a group —NR$^{11}$— or —CO—; and

R$^{10}$, R$^{11}$ and s are as defined.

In the compounds of formula 1, if the groups R$^3$, R$^4$ and R$^5$ are alkyl groups, they preferably contain from 1 up to 6 carbon atoms. The groups R$^3$, R$^4$ and R$^5$ are preferably all the same and m is one. R$^3$, R$^4$ and R$^5$ are preferably all aryl groups or all dialkylamino-groups but if R$^3$ and R$^4$ are both dimethylamino groups, then R$^5$ may be an alkoxy group. Compounds of formula 1 include tributylphosphine; triphenylphosphine; tributylphosphine oxide; triphenyl phosphine oxide; N,N,N',N'-tetramethylethyl phosphorodiamidate and hexamethyl-phosphoric triamide.

In the compounds of formula 2, it is preferred that R$^9$ is an alkyl group or a group —C$_n$H$_{2n}$NR$^7$R$^8$. R$^7$, R$^8$ and R$^9$ can all be the same and can be alkyl groups containing from 1 up to 6 carbon atoms. If R$^7$ and R$^8$ form a ring system, then R$^9$ can be included with R$^7$ and R$^8$ in the ring system or can be a hydrogen atom or an alkyl group. The group R$^9$ is preferably —C$_n$H$_{2n}$NR$^7$R$^8$, wherein n is 1 or preferably 2 and R$^7$ and R$^8$ are methyl groups. Compounds of formula 2 include di-n-butylamine, triethylamine, tri-n-butylamine, pyridine, piperidine, picoline, quinoline, isoquinoline or particularly N,N,N',N'-tetramethylmethylenediamine and N,N,N',N'-tetramethylethylenediamine.

In the compounds of formula 3, if X or Y are alkyl, alkoxy or alkylthio groups, it is preferred that the group contains from 1 up to 6 carbon atoms. It is preferred that p and q are zero or one and the groups X and Y are preferably the same. The groups R$^{10}$ and R$^{11}$ are conveniently alkyl groups having from 1 up to 6 carbon atoms. If the groups X and Y are replaced by a link between the two phenyl groups attached to the —SO$_2$— group, the linkage is conveniently direct, through an oxygen atom or especially through a —CH$_2$— group. Compounds of formula 3 include diphenyl sulphone, 4-(phenylthio)diphenylsulphone, 4-(phenoxy)diphenylsulphone, 2,4'-(diphenoxy)diphenylsulphone, 4,4'-(diphenoxy)diphenyl-sulphone, 4,4'-dichlorodiphenylsulphone, 4,4'-(dimethyl)-diphenylsulphone, 2,4,4'-(trimethyl)diphenylsulphone, 6-phenylsulphonyltetralin, dibenzothiophen-5,5-dioxide, phenoxathiin-10,10-dioxide, thioxanthene-10,10-dioxide and 10-methylphenothiazine-5,5-dioxide.

In the compounds of formula 4, the groups R$^{10}$, R$^{11}$ and R$^{12}$ are conveniently alkyl groups having from 1 up to 6 carbon atoms, but one, or both, of the groups R$^{11}$ and R$^{12}$ can be an aryl group. The group Z can be a bromine or a chlorine atom, or a phenoxy group. In the group

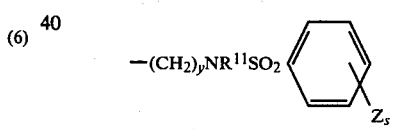

y is conveniently 1, 2 or 3 and s is zero. Compounds of formula 4 include N,N-dimethylbenzenesulphonamide, N,N-diethylbenzenesulphonamide, N,N-diphenyl-benzenesulphonamide, N-methyl-N-phenyl-4-bromobenzenesulphonamide, N-methyl-N-phenyl-4-chlorobenzenesulphonamide, N,N-diethyl-4-phenoxy-benzenesulphonamide and N,N'-dibenzenesulphonyl-N,N'-dimethyl-1,2-diaminoethane.

In the compound of formula 5, the group D is either a group —LG, in which case the compound is of the type

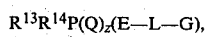

or the group D is a group —P(Q)$_z$R$^{13}$R$^{14}$, in which case the compound is of the type $$R^{13}R^{14}P(Q)_zEP(Q)_zR^{13}R^{14}, \qquad (5B)$$

or the group R$^{14}$ is ED and the groups D together form a group —L—, in which case the compound is of the type

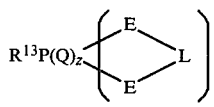 (5C)

In compounds of the type 5A and 5B the groups $R^{13}$ and $R^{14}$ are conveniently the same, and are alkylamino groups $-NR_2^{11}$ or alkoxy groups $-OR^{11}$ in which $R^{11}$ is a methyl or ethyl group. The group (E—L—G) can be, for example, of the type

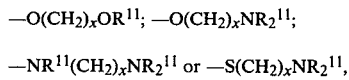

where x is an interger and is preferably 1, 2 or 3.

In compounds of the type 5C the group

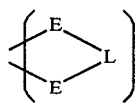

can be, for example, of the type

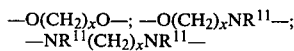

or

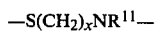

where x is as hereinbefore defined.

In compounds of the type 5A and 5C, it is preferred that at least one of the groups E is $-NR^{11}-$. However, in compounds of the type 5B, it is preferred that the group E joining the two phosphorus atoms, is an oxygen atom. It is preferred that z, or each z, is one and Q, or each Q, is an oxygen atom. Compounds of formula 5 include N,N,N',N',N''-pentamethyl-N''-β-dimethylaminoethyl phosphoric triamide; 2-dimethylamino-1,3-dimethyl-1,3,2-diaza-phospholidine-2-oxide; N,N,N',N'-tetramethyl-β-dimethylaminoethoxy phosphoric diamide; 2-ethoxy-1,3-dimethyl-1,3,2-diaza-phospholidine-2-oxide; 2-dimethylamino-1-methyl-1,3,2-azoxa-phospholidine oxide and octamethylpyrophosphoramide.

In compounds of the formula 6, when each s is zero, then when T is an oxygen atom, the compound is phenoxathiin, when T is a group $-NR^{11}-$, the compound is an N-hydrocarbyl substituted phenothiazine such as N-methylphenothiazine and when T is sulphur the compound is thianthrene.

The solid compound of the transition metal is ground with at least one compound A and it is also contacted with at least one Lewis Base. This contacting may be effected by mixing the ground transition metal compound with a solution, in an inert liquid medium such as an aliphatic hydrocarbon, of the Lewis Base or by effecting a grinding step in which the transition metal compound is ground in the presence of the Lewis Base.

The contacting of the Lewis Base with the transition metal compound is conveniently effected after the transition metal compound has been ground with the compound A. However, if the solid compound of the transition metal is ground with both the compound A and the Lewis Base, all the components may be added to the grinding apparatus before effecting grinding and then the contacting is effected simultaneously. Indeed, depending on the order in which the components are introduced into the grinding apparatus, the Lewis Base may contact the solid compound of the transition metal before the compound A is added.

If the ground transition metal compound is mixed with a solution of Lewis Base, this is preferably effected by heating to a temperature of at least 60° C. The mixture of the ground transition metal compound and the solution of the Lewis Base is conveniently heated at a temperature in the range from 80° C. up to 120° C. The mixture is conveniently maintained at a temperature of at least 60° C. for a time of from 0.5 up to 25 hours, especially from 2 up to 20 hours. During the contacting, it is preferred to agitate the mixture.

If the solid compound of the transition metal is ground both with the compound A and the Lewis Base, the grinding may be effected in two separate stages, during the first of which only the compound A is present, and during the second stage, the Lewis Base is also present. If grinding is effected in two separate stages then, during the second stage of the grinding, a metal halide such as aluminium chloride or titanium tetrachloride may also be present. However, it will be appreciated that all the components, including the optional metal halide, may be ground together in a single grinding stage.

The amount of the compound A which is ground with the transition metal compound is at least 0.01 mole, and not more than one mole, for each gramme atom of the transition metal which is present in the solid compound and is conveniently from 0.01 up to 0.50 mole, preferably from 0.05 up to 0.20 mole for each gramme atom of the transition metal which is present in the solid compound.

The amount of the Lewis Base is also at least 0.01 mole, and not more than 1.00 mole, for each gramme atom of the transition metal which is present in the solid compound and is conveniently from 0.05 up to 1.00 mole, preferably from 0.10 up to 0.50 mole for each gramme atom of the transition metal which is present in the solid compound. It is particularly preferred that the amount of the Lewis Base is at least equal to the amount of the compound A.

If a metal halide such as titanium tetrachloride or aluminum chloride, is present during the grinding, it is preferred that the amount, in moles, of the titanium tetrachloride or aluminium chloride does not exceed the amount, in moles, of the Lewis Base and the amount of the metal halide is conveniently from 0.01 up to 0.50, particularly from 0.10 up to 0.40, mole for each gramme atom of the transition metal which is present in the solid compound.

The grinding is conveniently effected using a ball mill and it is preferred that at least a proportion of the grinding is effected in the dry state; that is in the absence of added solvent and suspending liquids. The materials to be ground can be introduced into the mill, or other grinding apparatus, either in the absence of solvents, or as a solution or suspension in a suitable inert diluent which is subsequently removed either by heating, reducing the pressure, or both. The grinding can be effected at any suitable temperature and satisfactory results may be obtained by grinding at ambient temperature (about 20–25° C.) although it will be realised that higher or lower temperatures may be used if desired, for example from −10° C. up to 100° C. Grinding is effected for any suitable length of time, and typically milling times of from 5 hours up to 100 hours or more, for example from 24 up to 72 hours, may be used. It will be appreciated that the grinding time will be dependent on the intensity of the grinding and, when using a rotating ball mill (which gives a tumbling action) will depend on the material, size and number of balls used, and the speed of revolution of the ball mill. Other grinding techniques may be used, for example grinding in a vibrating mill, and using such other techniques, different times and temperatures of grinding may be preferred.

The ground product may be removed from the grinding apparatus as a dry solid but it may be more readily removed by adding a suitable liquid medium, in particular an inert organic liquid such as an aliphatic hydrocarbon, and washing out the ground solid as a suspension in the liquid medium. A convenient procedure is to add a suitable inert liquid medium to the mill and its contents and to continue the grinding process for a brief period, which is preferably not more than 30 minutes, and is in particular from 1 up to 20 minutes. The suspension thereby obtained is readily removed from the mill and residual quantities can be washed out using further quantities of the inert liquid medium. There appears to be a rapid reduction in the particle size of the solid during the wet grinding stage, and in order to avoid an undesirable particle size reduction, it is preferred to effect the wet grinding for only a relatively short period of time.

The process of the present invention is effected in an inert atmosphere, in the absence of any quantity of such oxygen-containing materials as air and water vapour, which quantity is sufficient to deleteriously affect the characteristics of the ground product as a component of an olefine polymerisation catalyst.

The ground product, particularly if it has been obtained by milling in the presence of titanium tetrachloride, may be washed, for example with an inert aliphatic or aromatic hydrocarbon before it is used as a component of an olefine polymerisation catalyst.

The ground transition metal compound which has been contacted with the Lewis Base is suitable for use in a catalyst for the polymerisation of ethylenically unsaturated hydrocarbon monomers.

Thus, according to a further aspect of the present invention, there is provided an olefine polymerisation catalyst comprising (1) a transition metal component which is the product of grinding a solid compound of a transition metal of Groups IVA to VIA of the Periodic Table with a minor proportion of at least one organic compound of the formula

and also contacting the said solid compound with a minor proportion of an organic-Lewis Base compound which is an organic compound containing at least one heteroatom which is a phosphorus, nitrogen or sulphur atom, wherein $R^1$ and $R^2$ are both as hereinbefore defined; and (2) at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

Component (1) of the catalyst is a material obtained in the manner hereinbefore described.

Component (2), the organo-metallic compound, can be a Grignard reagent which is substantially ether free, or a compound of the type $Mg(C_6H_5)_2$. Alternatively, component (2) can be a complex of an organo-metallic compound of a metal of Groups IA or IIA, such as, for example $Mg(AlEt_4)_2$ or a lithium aluminium tetraalkyl. It is preferred that component (2) is an organo-aluminium compound such as a bis-(dialkyl aluminium)oxyalkane, a bis(dialkyl aluminium)-oxide, an aluminium hydrocarbyl sulphate, an aluminium hydrocarbyl oxyhydrocarbyl or particularly an aluminium trihydrocarbyl or dihydrocarbyl aluminium hydride or halide especially aluminium triethyl or diethyl aluminium chloride. A mixture of compounds can be used if desired, for example a mixture of an aluminium trialkyl and an aluminium dialkyl halide. It may be preferred to use catalysts giving a low level of residual halogen in the polymer product, in which case component (2) is desirably a halogen-free compound, particularly an aluminium trihydrocarbyl.

In addition to the organo-Lewis Base compounds associated with component (1) of the catalyst, there may also be present a further quantity of an organo-Lewis Base compound (component (3)). The further organo-Lewis Base compound can be any such Lewis Base which is effective to alter the activity and/or stereospecificity of a Ziegler catalyst system.

The use of organo-Lewis Base compounds, or complexes including organo-Lewis Base compounds, in olefine polymerisation catalysts, is disclosed, inter alia in British Patent Specifications Nos. 803,198; 809,717; 880,998, 896,509; 920,118; 921,954; 933,236; 940,125; 966,025; 969,074; 971,248; 1,013,363; 1,017,977; 1,049,723; 1,122,010; 1,150,845; 1,208,815; 1,234,657; 1,324,173; and 1,359,328, Belgian Patent Specification No. 693,551; and published German Patent Applications Nos. 2,234,506 and 2,329,723. However, we prefer to use, as the further organo-Lewis Base compound, a Lewis Base (as hereinbefore defined), particularly such a Lewis Base which contains at least one atom of nitrogen and/or phosphorus. Thus, preferred organo-Lewis Base compounds, which can be used as the optional component (3) of the catalyst, include secondary or tertiary amines such as dibutylamine or tributylamine, diamines such as N,N,N',N'-tetramethylethylenediamine, and compounds which include both phosphorus and nitrogen atoms, such as hexamethylphosphoric triamide; N,N,N',N'-tetramethylethyl phosphorodiamidate; N,N,N',N',N''-pentamethyl-N''-β-dimethylaminoethylphosphoric triamide; 2-dimethylamino-1,3-dimethyl-1,3,2-diaza-phospholidine-2-oxide and octamethylpyrophosphoramide. Diphenylsulphone can be used as optional component (3) if desired.

In addition to, or instead of, the organo-Lewis Base compound which is component (3), the catalyst may also include a substituted or unsubstituted polyene (Component (4)), which may be an acyclic polyene such as 3-methylheptatriene (1,4,6) or a cyclic polyene such as cyclooctatriene, cyclooctatetraene or cycloheptatriene or derivatives of such polyenes such as the alkyl- or alkoxy-substituted polyenes; tropylium salts or complexes, tropolone or tropone.

The proportions of the various catalyst components can be varied widely depending both on the materials used and the absolute concentrations of the components. However, in general for each gramme atom of the transition metal which is present in component (1) of the catalyst, there is present at least 0.05, and preferably at least 1.0 mole of component (2), but it may be desirable to use much greater quantities of component (2), for example as many as 50 mole or even more, for each gramme atom of the transition metal. In general we prefer to use not more than 25, and particularly not more than 10, mole of component (2) for each gramme atom of the transition metal. The amount of the organo-Lewis Base compound, which is the optional component (3), is in the range from 0.01 up to 10, preferably from 0.05 up to 5.0, and especially from 0.2 up to 2 mole for each gramme atom of the transition metal which is present in component (1) of the catalyst, and the amount, in moles, of component (3) is less than the amount, in moles, of component (2). The number of moles of any polyene which is present in the catalyst should preferably be less than the number of moles of component (2) of the catalyst. For each mole of component (2), there is conveniently present from 0.01 up to 1.0, especially 0.05 up to 0.5, for example 0.2 mole of the polyene. If the catalyst includes both components (3) and (4) the number of moles of the organo-Lewis Base compound which is compound (3) and the polyene should preferably, in total, be less than the number of moles of component (2) of the catalyst. If the catalyst includes both components (3) and (4), these can conveniently be used in equimolar proportions but the relative proportions of these components may be varied to give the optimum result.

A preferred catalyst within the present invention comprises:

(1) a titanium trichloride containing material obtained by milling a titanium trichloride material in the presence of from 0.01 up to 0.50 mole, preferably from 0.05 up to 0.20 mole, for each gramme atom of titanium which is present in the titanium trichloride material, of at least one organic compound of the formula:

$R^1COOR^2$ and also contacting with a minor proportion of at least one organo-Lewis Base compound which is selected from materials of the formulae:-

 (1)
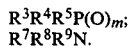 (2)

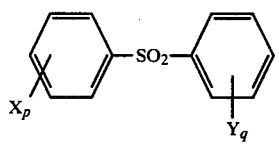 (3)

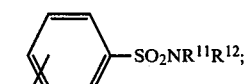 (4)

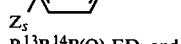 (5)

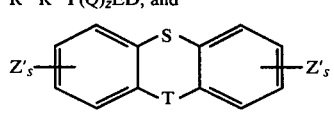 (6)

(2) at least one organo-aluminium compound; and optionally (3) a further quantity of at least one organo-Lewis Base compound which is selected from materials of the formulae (1), (2), (3), (4), (5) and (6) as hereinbefore defined where D, E, $R^1$ to $R^5$, $R^7$ to $R^9$, $R^{11}$ to $R^{14}$, Q, T, X, Y, Z, Z′, m, p, q, s and z are all as hereinbefore defined.

It will be appreciated that component (1) may be a material in which grinding has been effected in the presence of a metal halide such as aluminium chloride or titanium tetrachloride.

The Lewis Base which is component (3) of the catalyst is conveniently hexamethylphosphoric triamide; 2-dimethylamino-1,3-dimethyl-1,3,2-diazaphospholidine-2-oxide; N,N,N′,N′,N″-pentamethyl-N″-β-dimethylaminoethyl phosphoric triamide; tetramethylethylenediamine; tributylamine or diphenylsulphone.

The catalysts of the present invention are particularly suitable for the polymerisation and copolymerisation of olefine monomers by contacting at least one olefine monomer with a catalyst of the type hereinbefore defined.

More specifically, there is provided a process for the production of a polymer or copolymer of an olefine monomer wherein at least one olefine monomer, or a mixture of at least one olefine monomer and ethylene, is contacted with an olefine polymerisation catalyst as hereinbefore defined.

Any olefine monomer, particularly mono-α-olefine monomer, which is capable of being polymerised using a Ziegler catalyst may be polymerised by the process of the present invention. Thus, monomers which can be polymerised by the present process include butene-1, and 4-methylpentene-1 and particularly propylene. These olefines may be copolymerised together but we prefer to effect copolymerisation with ethylene, conveniently using a sequential polymerisation process such as described in British Patents Nos. 970 478; 970 479 and 1 014 944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, it is desirable that the monomers and any diluents which are of commercial purity are subjected to a further purification procedure.

The purification treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Patent Specifications Nos. 1,111,493 and 1,226,659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch process, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of a solid material may be inconvenient, it may be preferred that all of the transition metal compound is added, together with some of each of the other catalyst components, to initiate polymerisation and the rest of the other catalyst components are added during the polymerisation.

The polymerisation can be effected in the presence of a chain transfer agent such as hydrogen or a zinc dialkyl, in order to control the molecular weight of the product formed. If hydrogen is used as the chain transfer agent, it is conveniently used in an amount of from 0.01 up to 5.0%, particularly from 0.10 up to 2.0% molar relative to the monomer. The amount of chain transfer agent will be dependent on the polymerisation conditions, especially the temperature, which is typically in the range from 20° C. up to 100° C., preferably from 50° C. up to 85° C.

Using catalysts in accordance with the present invention propylene may be polymerised to give a high yield, relative to the transistion metal content of the catalyst, of a polymer having a high flexural modulus.

Using the process of the present invention, polymers, particularly propylene homopolymers, can be obtained which have a flexural modulus of at least 1.00 $GN/m^2$, particularly at least 1.30 $GN/m^2$.

The flexural modulus of the polymer is the modulus as measured by the apparatus described by Polymer Age, Mar. 1970, pages 57 and 58 at 1% skin strain after 60 seconds at 23° C. and 50% relative humidity using test specimens prepared as described in respect of Example 20.

Polymers produced by the process of the present invention have a high molecular weight as indicated by the melt flow index measured according to ASTM Test Method D 1238-70, using Condition N (that is a temperature of 190° C. and a weight of 10 kgm). Polymers in accordance with the present invention have a melt flow index of less than 200. Preferred polymers have a melt flow index of less than 100, particularly less than 50, for example between 5 and 50.

Various aspects of the present invention will now be described with reference to the following Examples which are illustrative of the invention. In the Examples, all operations were effected under an atmosphere of nitrogen unless otherwise indicated.

EXAMPLE 1

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill. 20 gm of titanium trichloride (Stauffer-AA) were introduced as a solid into the mill which was shaken manually. 1 gram of methylmethacrylate (0.10 mole based on the $TiCl_3$ content of the Stauffer-AA) was introduced dropwise over a period of 10 minutes into the mill from a syringe whilst the mill was being rotated at 120 rpm. When all of the methylmethacrylate had been introduced into the mill it was rotated at 120 rpm for 24 hours, without applying any heating or cooling to the mill.

After milling for 24 hours, rotation of the mill was stopped and the titanium trichloride product was suspended in an inert aliphatic hydrocarbon liquid (boiling point range of about 170–180° C.) and readily removed from the mill.

A sample of the suspension thus obtained, containing 25 millimoles of titanium trichloride, was transferred to a tubular vessel of capacity 200 $cm^3$, which vessel was provided with a stirrer. The suspension was allowed to settle and the supernatant liquid was decanted off. 49 $cm^3$ of sodium-dried toluene were added and the mixture was stirred. A solution of 2.5 millimoles of hexamethylphosphoric triamide in 25 $cm^3$ of toluene were added at a rate of 5 $cm^3$ every 5 minutes.

The mixture was stirred overnight (about 17 hours) and then heated, with stirring, up to a temperature of 110° C. The temperature of 110° C. was maintained for 4 hours and then the mixture was allowed to cool and settle.

A sample of the material milled with methylmethacrylate was recovered and used for propylene polymerisation without being contacted with the hexamethylphosphoric triamide solution. This material will hereafter be referred to as $TiCl_3$-MMA (milled with methylmethacrylate).

EXAMPLES 2 TO 5

The titanium trichloride product of Example 1, and $TiCl_3$-MMA were used to polymerise propylene.

The propylene used for the polymerisation had been purified by passing gaseous propylene in turn through a column (3 inches diameter, 3 feet length) containing 1/16 inch granules of Alcoa F1 alumina at 50-60° C., and then through a similar column containing BTS catalyst (Cupric oxide reduced to finely divided metallic copper on a magnesium oxide support) at 40-50° C., condensing the issue gas and passing the liquid propylene through four columns (all 3 inches diameter; two of 3 feed in length, two of 6 feet in length) at 25° C., each containing 1/16 inch pellets of Union Carbide 3A molecular sieves.

This treatment reduced the water content of the monomer from 5-10 ppm by volume to <1 ppm by volume and the oxygen content from 1-2 ppm by volume to <0.5 ppm by volume. The level of inert compounds (nitrogen, ethane, etc.) was unchanged at 0.3% and the level of unsaturated hydrocarbons (allene, methylacetylene etc.) was unchanged at <1 ppm.

a polymerisation flask equipped with efficient stirrer and a water jacket was dried carefully and 1 liter of an inert hydrocarbon diluent having a boiling range of about 170–180° C. was introduced. The diluent was evacuated at 60° C. purged with nitrogen and evacuated which treatment effectively reduced the water and oxygen contents of the diluent to below 10 ppm by weight. The diluent was then saturated with the purified propylene to one atmosphere pressure. An aluminum alkyl compound was introduced in the amount shown in the Table. In some examples a quantity of hexamethylphosphoric triamide, as shown in the Table, was introduced directly after the aluminium alkyl compound. After half an hour $TiCl_3$ obtained as described in Example 1 was introduced in the amount shown in Table 1. The pressure in the reaction vessel was maintained at one atmosphere by supply of propylene from a burette. After a period of 2.5 or 3.0 hours from the introduction of the $TiCl_3$ the run was terminated with 10 ml of isopropanol and a sample of supernatant liquid extracted for determining the concentration of soluble polymer dissolved in the polymerisation diluent. The solid was filtered and washed three times with petrol ether and dried in a vacuum oven at 120° C. for an hour. The yield of solid plus calculated soluble polymer equalled within experimental error the propylene loss from the burette.

The results obtained are set out in the Table 1, comparative examples being indicated by letters.

The sulphone and the titanium tetrachloride were added under an inert atmosphere of dry nitrogen. The titanium tetrachloride was added slowly from a syringe and distributed as evenly as possible within the mill. Milling was continued at 120 rpm, spraying water at 20° C. onto the outside of the mill. After 48 hours, 100 ml of an inert aliphatic hydrocarbon liquid, as described in Example 1, was added and milling was continued for a further 15 minutes. The resulting slurry was transferred to a storage vessel and the mill was washed four times with 50 ml aliquots of the same inert hydrocarbon diluent. The washings were transferred to the storage vessel.

EXAMPLE 7

The procedure of Example 6 was repeated except that the milling of Stauffer-AA and methylmethacrylate was effected for 18 hours, spraying water at 10° C. onto the outside of the mill, and the quantity of methylmethacrylate used was 0.10 mole based on the titanium trichloride content of the Stauffer-AA.

EXAMPLE 8

The procedure of Example 6 was repeated except that the milling of the Stauffer-AA and methylmethacrylate was effected for 18 hours, spraying water at 20° C. onto the outside of the mill, and the milling in the presence of the inert aliphatic hydrocarbon liquid was effected for only 5 minutes.

EXAMPLE 9

The procedure of Example 6 was repeated except

TABLE 1

| Example or Comparative Example | $TiCl_3$ type (a) | $TiCl_3$ Amount (mM) | Al Compound Type (b) | Al Compound Amount (mM) | HMPT (mM) (c) | Polymerisation Time (hrs) | Yield of Solid Polymer (g/mM $TiCl_3$) (d) | % Weight of Diluent Soluble Polymer (e) |
|---|---|---|---|---|---|---|---|---|
| 2 | 1 | 5 | DEAC | 10 | NIL | 3.0 | 11.6 | 0.2 |
| 3 | 1 | 2 | TEA | 4 | NIL | 2.5 | 43.5 | 10.0 |
| 4 | 1 | 2 | TEA | 4 | 2.0 | 2.5 | 47.3 | 3.7 |
| 5 | 1 | 2 | TEA | 4 | 2.5 | 2.5 | 34.3 | 2.6 |
| A | MMA | 2 | TEA | 4 | 2.0 | 2.5 | 54.4 | 5.6 |
| B | MMA | 2 | TEA | 4 | 3.0 | 2.5 | 33.0 | 4.2 |
| C | MMA | 5 | DEAC | 10 | NIL | 3.0 | 11.0 | 1.1 |
| D | MMA | 2 | TEA | 4 | NIL | 2.5 | 40.7 | 27.2 |

Notes to Table 1
(a) 1 is product of Example 1 MMA is $TiCl_3$-MMA (as defined)
(b) DEAC is diethyl aluminium chloride TEA is triethyl aluminium
(c) HMPT is hexamethylphosphoric triamide
(d) Based on solid polymer only relative to the $TiCl_3$ content of the catalyst
(e) % based on total polymer (solid + soluble) formed.

EXAMPLE 6

Stauffer-AA was milled with methylmethacrylate, diphenyl sulphone and titanium tetrachloride using a mill as described in Example 1. The milling procedure was as follows.

Stauffer-AA (19.8 grammes) was introduced into the mill which had previously been cooled to 5° C., followed by methylmethacrylate in an amount of 0.05 mole based on the titanium trichloride content of the Stauffer-AA. The mill was rotated at 120 rpm and water at 9° C. was sprayed onto the outside of the mill.

After milling for 16 hours, the spray of water was turned off and rotation of the mill was stopped. To the mill was then added diphenyl sulphone (0.20 mole based on the titanium trichloride content of the Stauffer-AA) followed by titanium tetrachloride (0.10 mole based on the titanium trichloride content of the Stauffer-AA).

that all the materials were added to the mill before effecting any milling, the materials being added to the mill in the order, diphenyl sulphone, Stauffer-AA, methylmethacrylate and titanium tetrachloride and milling then being effected for 64 hours whilst spraying water at 20° C. onto the outside of the mill.

EXAMPLE 10

The procedure of Example 9 was repeated except that the milling in the presence of the inert aliphatic hydrocarbon was effected for only 5 minutes.

EXAMPLE 11

The procedure of Example 6 was repeated except that the mill was initially charged with diphenyl sulphone, then Stauffer-AA and finally titanium tetrachloride and milled for 18 hours whilst spraying water at 20°

C. onto the outside of the mill. The methylmethacrylate was then added and the mixture was milled for 64 hours whilst spraying water at 20° C. onto the outside of the mill. The milling in the presence of the inert aliphatic hydrocarbon liquid was effected for only 5 minutes.

EXAMPLES 12 to 15

The polymerisation procedure of Examples 2 to 5 was repeated at 60° C. using a polymerisation time of three hours, a catalyst system consisting of 10 millimoles of diethyl aluminium chloride, 0.75 millimoles of hexamethylphosphoric triamide and 2 millimoles of a titanium trichloride product obtained as described in Examples 6 to 11, and using propylene containing about 0.15% by volume of hydrogen.

The results obtained are given in Table 2.

TABLE 2

| Example No. | Type of TiCl$_3$ (f) | Yield of Solid Polymer (g/mM TiCl$_3$) (d) | % weight of Diluent Soluble Polymer (e) |
|---|---|---|---|
| 12 | 8 | 22.7 | 0.78 |
| 13 | 9 | 22.2 | 0.72 |
| 14 | 10 | 20 | 0.06 |
| 15 | 11 | 14.9 | 0.08 |

Notes to Table 2
(d) and (e) are as defined in Notes to Table 1
(f) The number refers to the Example describing the preparation of the TiCl$_3$ material.

EXAMPLES 16 TO 19

The polymerisation procedure of Examples 12 to 15 was repeated except that the polymerisation temperature was b 70° C., the polymerisation time was 4 hours and the catalyst contained 1.0 millimole of tributylamine instead of the hexamethylphosphoric triamide.

The results obtained are given in Table 3.

TABLE 3

| Example No. | Type of TiCl$_3$ (f) | Yield of Solid Polymer (g/mM TiCl$_3$) (d) | % Weight of Diluent Soluble Polymer (e) |
|---|---|---|---|
| 16 | 6 | 40.1 | 0.7 |
| 17 | 7 | 45.6 | 2.06 |
| 18 | 8 | 35.0 | 2.7 |
| 19 | 10 | 37.2 | 0.68 |

Notes to Table 3
(d) and (e) are as defined in Notes to Table 1
(f) is as defined in Notes to Table 2.

EXAMPLE 20

Polymerisation was effected in the gas phase using a steel autoclave of capacity 8 liters fitted with an anchor stirrer/scraper. 400 g of dry polypropylene was added while stirring the autoclave at 60° C. The stirrer speed was 120 rpm. The autoclave was evacuated, after half an hour the vacuum was released with propylene, and then the autoclave was re-evaluated. This procedure was repeated a further five times over an hour and a half to leave an atmosphere of propylene. The stirrer was stopped and 24 millimoles of diethyl aluminium chloride in heptane were added. The autoclave contents were stirred for a minute, then 3 millimoles of the titanium trichloride material obtained in Example 6 were added. The stirrer was restarted and propylene gas was then admitted to the top of the autoclave from a heated stock vessel containing liquid propylene. A pressure of 340 psi gauge was established over a period of about 30 minutes. The temperature was maintained at 60° C. throughout. Hydrogen was added evenly during the pressurisation stage at a rate of 27 mM per 100 psig pressure rise. Polymerisation was effected at 340 psig and 60° C., and hydrogen was added in aliquots of 13 mM for every 80 g of liquid propylene evaporated into the autoclave from the stock vessel. After 4 hours polymerisation the propylene supply was switched off, and the autoclave vented to atmospheric pressure. The gas cap was purged with nitrogen and the polymer emptied out. The polymer obtained was a free flowing pink powder. The polymer initially present in the reactor had the following characteristics:

Ti content:43 ppm
MFI:23
Flex Mod:1.43 GNm$^{-2}$

Further details and the results obtained are set out in Table 4.

TABLE 4

| Example No. | Ti Content (ppm by wt) (g) | MFI (h) | Flex Mod (GNm$^{-2}$) (j) |
|---|---|---|---|
| 20 | 131 | 17 | 1.48 |

Notes to Table 4
(g) Determined by X-ray fluorescence and makes allowance for the titanium content of the initial polymer.
(h) MFI (melt flow index) was determined by ASTM Test Method D 1238-70, Condition N (190° C. and 10 kg).
(j) The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip had dimensions of approximately 150 × 19 × 1.6 mm and was prepared as follows: 23 g of polymer was mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil, and pressed by means of an electric Tangye Press at a temperature of 250° C. The pressing was pre-heated for a period of six minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C., and after 2 hours at this temperature the heat was switched off and the oven cooled to ambient temperature at 15° C. per hour. No allowance was made for the presence of the initial polymer, the flexural modulus reported in Table 4 being the measured value.

We claim:
1. a process for the treatment of a transition metal compound which comprises grinding a solid compound of a transition metal of Groups IVA to VIA of the Periodic Table with at least 0.01 mole, and not more than one mole, for each gramme atom of the transition metal which is present in the solid compound, of at least one organic compound of the formula

$$R^1COOR^2$$

and also with at least 0.01 mole, and not more than one mole, for each gramme atom of the transition metal which is present in the solid compound, of at least one organo-Lewis Base compound having one of the formulae $$X_p\text{-}C_6H_4\text{-}SO_2\text{-}C_6H_4\text{-}Y_q$$ ;

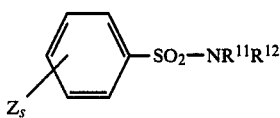
; or

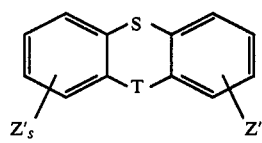

where
R$^1$ is an alkyl, aryl, alkenyl, aralkyl or alkaryl group;
R$^2$ is a hydrogen atom or an alkyl, aryl, alkenyl, aralkyl or alkaryl group;
X, or each X, is, independently, a halogen atom, an alkyl, aryl, alkoxy, aryloxy, alkylthio, or arylthio group, or a group —NR$^{10}$R$^{11}$, or two groups X can together form a saturated or unsaturated hydrocarbon ring;
Y, or each Y, is, independently, a halogen atom, an alkyl, aryl, alkoxy, aryloxy, alkylthio, or arylthio group, or a group —NR$^{10}$R$^{11}$, or two groups Y can together form a saturated or unsaturated hydrocarbon ring; or a group X and a group Y may be replaced by a link between the two phenyl groups attached to the —SO$_2$— group, the linkage being either direct or through a group —O—, —CH$_2$—, —NR$^{10}$—, —S—or —CO—;
R$^{10}$ is a hydrogen atom or a hydrocarbyl group;
R$^{11}$ is a hydrocarbyl group;
Z, or each Z, is, independently, a halogen atom, an alkyl, aryl, alkoxy, aryloxy, alkylthio, or arylthio group, or a group —NR$^{10}$R$^{11}$, or two groups Z can together form a saturated or unsaturated hydrocarbon ring;
R$^{12}$ is a hydrocarbyl group or a group

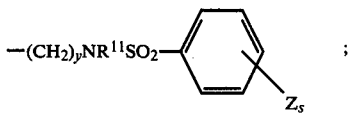
;

T is —S—, —O—, —NR$^{11}$—; or —CO—;
Z', or each Z', is, independently, a halogen atom, an alkyl, aryl, alkoxy, aryloxy, alkylthio or arylthio group, or a group —NR$^{10}$R$^{11}$;
p and q are each, independently, an integer from 0 up to 5;
s is an integer from 0 up to 5; and
y is a positive integer.

2. The process of claim 1 which comprises grinding the transition metal compound with a compound R$^1$COOR$^2$, in which R$^1$ and R$^2$ are both independently, an alkyl or alkenyl group containing 1 up to 20 carbon atoms, or an aryl, aralkyl or alkaryl group containing 6 up to 15 carbon atoms.

3. The process of claim 1 wherein the transition metal compound is ground with at least one organo-Lewis Base compound in the presence of aluminium chloride or titanium tetrachloride.

4. The process of claim 1 wherein the transition metal compound is ground with from 0.01 up to 0.50 mole of the organic compound R$^1$COOR$^2$ for each gramme atom of the transition metal which is present in the solid compound.

5. The process of claim 1 wherein the transition metal compound is ground with from 0.05 up to 1.00 mole of the organo-Lewis Base compound for each gramme atom of the transition metal which is present in the solid compound.

6. The process of claim 3 wherein the transition metal compound is ground with the organo-Lewis Base compound in the presence of from 0.01 up to 0.50 mole of titanium tetrachloride or aluminium chloride for each gramme atom of the transition metal which is present in the solid compound.

7. The process of claim 1 which comprises ball milling at a temperature from −10° C. up to 100° C. for a time of from 5 hours up to 100 hours.

8. The process of claim 1 wherein the transition metal compound is washed with an inert aliphatic or aromatic hydrocarbon.

9. An olefine polymerisation catalyst comprising
1. a transition metal compound which is the product obtained by the process of claim 1; and
2. at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

10. The catalyst of claim 9 which also contains an organo-Lewis Base compound which is a compound of one of the formulae

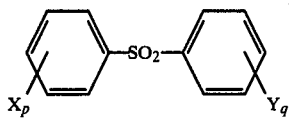

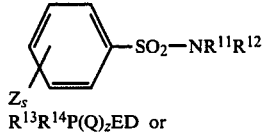

R$^{13}$R$^{14}$P(Q)$_z$ED or

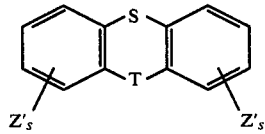

where
R$^{11}$, R$^{12}$, T, X, Y, Z, Z', p, q and s are all as defined;
R$^3$, R$^4$ and R$^5$ are each, independently, an alkyl or aryl group, or a group —NR$_2$$^6$ or —OR$^6$;
R$^6$ is an alkyl group of 1 to 4 carbon atoms;
R$^7$ and R$^8$ are hydrocarbyl groups;
R$^9$ is a hydrogen atom, an alkyl group, or a group —C$_n$H$_{2n}$NR$^7$R$^8$; or
R$^7$ and R$^8$, optionally with R$^9$, together form a substituted or unsubstituted, saturated or unsaturated, condensed or uncondensed ring system;
R$^{13}$ is a halogen atom, a hydrocarbyl group, a group —NR$_2$$^{11}$ or —OR$^{11}$, a heterocyclic group or a group (E—L—G);
R$^{14}$ is a halogen atom, a hydrocarbyl group, a group —NR$_2$$^{11}$ or —OR$^{11}$, a heterocyclic group or a group (E—L—G) or ED:

each E is —O—, —S—, or —NR$^{11}$—, and may be the same or different;

G is —OR$^{11}$, —SR$^{11}$, —NR$_2^{11}$, —PR$_2^{11}$ or a heterocyclic ring system whereof the heteroatom is O, S, N or P;

D is a group —LG or —P(Q)$_z$R$^{13}$R$^{14}$, or, when R$^{14}$ is ED, both the D groups may together form a group —L—, L is a bivalent hydrocarbyl radical such that E and G or E and E are separated by not more than 3 carbon atoms;

Q is an oxygen or sulphur atom;

m is 0 or 1;

n is 1, 2 or 3; and z is 0 or 1.

11. The catalyst of claim 9 which also contains 4. a substituted or unsubstituted polyene.

* * * * *